United States Patent
Guennal

(10) Patent No.: US 10,021,862 B2
(45) Date of Patent: Jul. 17, 2018

(54) ANGLING LURE

(75) Inventor: Matthieu Guennal, Ploneour Lanvern (FR)

(73) Assignee: FIIISH, Brest (FR)

( * ) Notice: Subject to any disclaimer, the term of this patent is extended or adjusted under 35 U.S.C. 154(b) by 246 days.

(21) Appl. No.: 13/580,543

(22) PCT Filed: Mar. 20, 2011

(86) PCT No.: PCT/FR2011/050586
§ 371 (c)(1),
(2), (4) Date: Aug. 22, 2012

(87) PCT Pub. No.: WO2011/117529
PCT Pub. Date: Sep. 29, 2011

(65) Prior Publication Data
US 2012/0311917 A1 Dec. 13, 2012

(30) Foreign Application Priority Data
Mar. 22, 2010 (FR) ...................................... 10 01115

(51) Int. Cl.
*A01K 85/00* (2006.01)
*A01K 85/18* (2006.01)

(52) U.S. Cl.
CPC .............. *A01K 85/00* (2013.01); *A01K 85/18* (2013.01)

(58) Field of Classification Search
CPC ......... A01K 85/18; A01K 85/00; A01K 85/02
USPC ............. 43/42.24, 42.1, 42.41, 42.15, 42.29, 43/42.39, 42.37, 42.38, 44.2, 44.8
See application file for complete search history.

(56) References Cited

U.S. PATENT DOCUMENTS

| 151,394 | A | * | 5/1874 | Huard et al. ....................... 43/35 |
| 330,793 | A | * | 11/1885 | Lie ..................................... 43/35 |
| 643,573 | A | * | 2/1900 | Votaw et al. ............ A01K 85/12 43/42.24 |
| 1,021,699 | A | * | 3/1912 | Nordlund ........................... 43/35 |
| 1,348,670 | A | * | 8/1920 | Viehweger ........................ 43/35 |
| 1,670,174 | A | * | 5/1928 | Wiersma ........................... 43/35 |
| 2,554,049 | A | * | 5/1951 | Nacey ..................... A01K 85/12 43/42.2 |

(Continued)

FOREIGN PATENT DOCUMENTS

| DE | 202008005783 U1 | 7/2008 |
| JP | 2001258426 A | 9/2001 |
| JP | 2004166521 A | 6/2004 |

OTHER PUBLICATIONS

International Search Report for corresponding International Application No. PCT/FR2011/050586.

*Primary Examiner* — Marc R Burgess
*Assistant Examiner* — Morgan T Barlow
(74) *Attorney, Agent, or Firm* — Egbert Law Offices, PLLC

(57) ABSTRACT

An angling has a rigid head with a rear face, a flexible body having a front end and a second end adapted to contact the rear face, a hook having an eyelet and a point, and an attachment rod having a first end fastened to the rigid head and a free second end. The attachment rod has a fixing portion onto which the eyelet is retained and a vertical retaining portion exerting a force compressing the rigid body so as to retain the rigid body against the rear face of the rigid head. The head and the body have a shape corresponding to a shape of bait.

5 Claims, 1 Drawing Sheet

(56) References Cited

U.S. PATENT DOCUMENTS

| | | | | |
|---|---|---|---|---|
| 2,563,880 | A * | 8/1951 | Spaid | 43/37 |
| 2,794,288 | A * | 6/1957 | Marshall et al. | 43/42.11 |
| 2,869,279 | A * | 1/1959 | Pretorius | A01K 85/01 43/42.06 |
| 3,393,465 | A * | 7/1968 | Powell | 43/42.28 |
| 3,724,116 | A * | 4/1973 | Lindner et al. | 43/42.24 |
| 3,868,784 | A * | 3/1975 | Sabol | 43/42.23 |
| D237,492 | S * | 11/1975 | Zimmerman | 43/42.24 |
| 4,094,087 | A * | 6/1978 | Carpenter | 43/42.24 |
| 4,136,479 | A * | 1/1979 | Pierceall | 43/42.22 |
| 4,167,076 | A * | 9/1979 | Weaver | 43/42.2 |
| 4,334,381 | A * | 6/1982 | Carver et al. | 43/42.29 |
| 4,367,607 | A * | 1/1983 | Hedman | A01K 85/00 43/42.1 |
| 4,744,168 | A * | 5/1988 | McClellan | 43/42.24 |
| 4,783,928 | A * | 11/1988 | Weaver | 43/42.24 |
| 4,791,749 | A * | 12/1988 | Stazo | 43/42.29 |
| 4,799,329 | A * | 1/1989 | Paulsen | 43/42.28 |
| 4,918,854 | A * | 4/1990 | Webre, Jr. | 43/42.31 |
| 5,070,639 | A * | 12/1991 | Pippert | 43/42.31 |
| 5,142,811 | A * | 9/1992 | Freeman | 43/42.53 |
| 5,152,094 | A * | 10/1992 | Strickland | A01K 85/00 43/42.24 |
| 5,161,323 | A * | 11/1992 | Braden | 43/37 |
| 5,335,441 | A * | 8/1994 | Blackwell | 43/42.36 |
| 5,377,442 | A * | 1/1995 | Gariglio | 43/44.4 |
| 5,522,170 | A * | 6/1996 | Cole | A01K 85/18 43/42.11 |
| 5,535,540 | A * | 7/1996 | Crumrine | A01K 85/00 43/42.09 |
| 5,564,220 | A * | 10/1996 | Blicha | 43/42.32 |
| 5,664,364 | A * | 9/1997 | Clark | 43/43.16 |
| 5,815,978 | A * | 10/1998 | Huddleston | 43/42.09 |
| 6,233,863 | B1 * | 5/2001 | Dotson | A01K 85/00 43/42.09 |
| 6,266,916 | B1 * | 7/2001 | Dugan | 43/42.37 |
| 6,871,442 | B2 * | 3/2005 | Wyatt | 43/41 |
| 7,234,267 | B1 * | 6/2007 | Konstant | 43/42.36 |
| 7,322,150 | B1 * | 1/2008 | Kent | 43/42.25 |
| 7,497,046 | B1 * | 3/2009 | Jefferson | 43/42.24 |
| 7,845,107 | B1 * | 12/2010 | Mell | 43/42.24 |
| 2002/0073604 | A1 * | 6/2002 | Brinkman | 43/42.02 |
| 2003/0159328 | A1 * | 8/2003 | Acker | 43/42.37 |
| 2003/0159331 | A1 | 8/2003 | Pasley | |
| 2004/0172874 | A1 * | 9/2004 | Minegar | 43/35 |
| 2006/0037232 | A1 * | 2/2006 | Gill | 43/42.39 |
| 2007/0175083 | A1 * | 8/2007 | Wilson et al. | 43/42.15 |
| 2009/0119971 | A1 * | 5/2009 | Miyasato et al. | 43/42.39 |
| 2009/0265975 | A1 * | 10/2009 | Gibson | 43/42.39 |
| 2010/0223833 | A1 * | 9/2010 | Rigney | 43/42.22 |
| 2010/0269398 | A1 * | 10/2010 | Ware | 43/17.6 |
| 2011/0010983 | A1 * | 1/2011 | Briccetti et al. | 43/17.6 |
| 2013/0180158 | A1 * | 7/2013 | Butters | 43/42.1 |

* cited by examiner

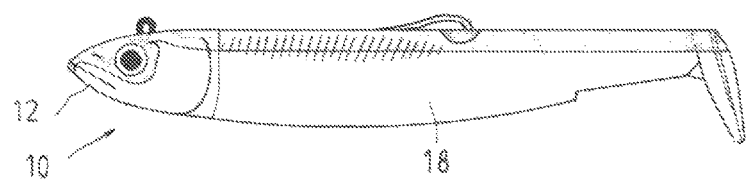
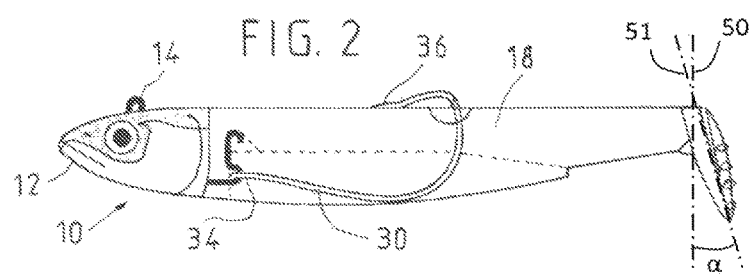
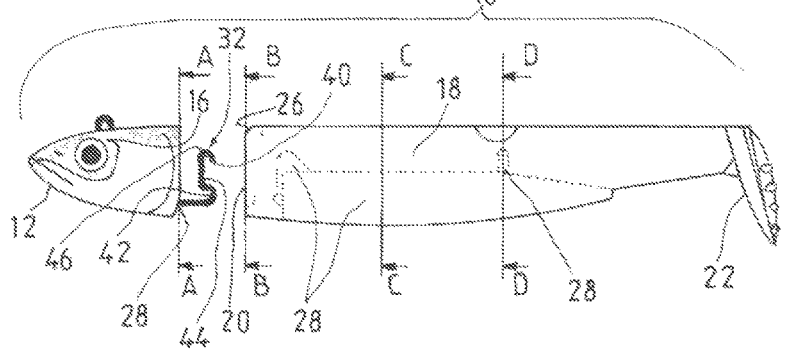
   
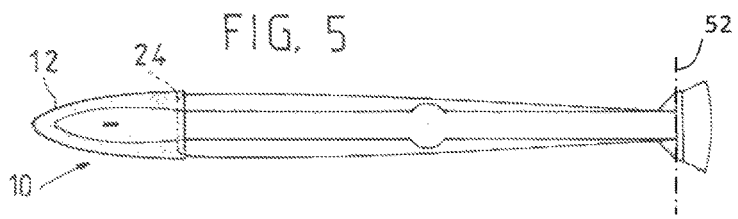

ANGLING LURE

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to angling lures used as bait when fishing with a line.

It concerns more particularly an angling lure including a rigid head having a rear face, a flexible material body extending longitudinally between a front end and a rear end, the front end being adapted to come into contact with the rear face, so as to form a lure having the shape of bait for fish, a hook extending between a first end including an eyelet and a second end including a point.

2. Description of Related Art Including Information Disclosed Under 37 CFR 1.97 and 37 CFR 1.98.

There is known from the document U.S. Pat. No. 4,791,749 an angling lure of the type described above including a lead head through which a rigid cable is inserted. The end of the rigid cable has a curved shape adapted to receive the eyelet of a hook. The lead head includes two re-entrant projections enabling the head to be held in place in the body. Thanks to these features, the hook is removable and the lure may receive hooks of different sizes, exiting the plastic body at different places.

There is known from the document US2007/0175083 a lure including a lead head on which a hook is mounted. The shaft of the hook includes projecting parts that engage in the parts of the plastic body to retain the hook therein.

Although the lures described above are made in two parts and include means for connecting the body to the head, they have the drawback of being easily separated, notably in aquatic media where the environment is sufficiently aggressive to pull the body off the head of such lures.

BRIEF SUMMARY OF THE INVENTION

The aim of the present invention is to alleviate these drawbacks and to propose a lure the components of which are perfectly held together, even in an aquatic medium, at the same time as assuring easy assembly of the various components.

The invention proposes an angling lure including:
a rigid head having a rear face,
a flexible material body extending longitudinally between a front end and a rear end, the front end being adapted to come into contact with the rear face, so as to form a lure having the shape of bait for fish, and
a hook extending between a first end including an eyelet and a second end including a point.

The lure being characterized in that it further includes an attachment rod including a first end fastened to the head and a free second end so that the eyelet of the hook can be threaded onto the attachment rod, the attachment rod also including between the first end and the second end of the attachment rod a fixing portion around which the eyelet of the hook is retained and a retaining portion lying substantially in a vertical plane passing through the longitudinal axis, the retaining portion being adapted to exert a force compressing the portion of the body disposed between the rear face of the head and the attachment rod so as to retain the body against the rear face of the head.

The lure is further characterized in that the body comprises openings adapted to receive the hook and the attachment rod.

Thanks to these features the attachment rod of the invention assures better retention of the body on the head and guarantees a strong lure in a water course or at sea. In this way, the retaining part enables the body to be held clamped. The body is retained to the head by compression of the holding part of the attachment rod in an associated opening of the body. Moreover, assembly and manipulation of the lure by the user are facilitated by the fact of having openings provided in the body to receive the hook and the attachment rod. In this way the body may be used several times without deterioration. Also, the lure necessitates no crimping or manipulation with pliers to trap the eyelet of the hook in the retaining part and the hook can also be mounted and demounted without using tools.

In one variant the attachment rod is S-shaped. The S shape provides ease of assembly by virtue of the curved shape at the top and assures retention of the eyelet of the hook by virtue of the curved shape at the bottom. Moreover, the curved shape at the bottom prevents the hook sliding upward.

In another variant the rear face comprises a first rim adapted to come into contact with a second edge of the body. In this way, the association of the rim of the head and the edge of the body forms guide means for the head assuring contact of the body and the head.

In a further variant, the fixing part adapted to receive the eyelet of the hook is fixed directly and firmly to the head. Thus the fixing part and the body form a single part enabling manipulation and assembly of the lure to be facilitated.

In a further variant the free end of the attachment rod is curved so as to prevent the free end digging into the body. Being curved, the free end prevents deterioration of the body with the result that the body may be reused. Moreover, the free end cooperates with the opening of the body in such a way as to improve the prevention of rotation of the body relative to the head.

In a further variant, the rear face of the head has a lower area to which the fixing portion is fixed, a central area which the retaining portion faces, and an upper area.

This feature enables demonstration of the feature of the offset between the lower attachment area of the hook and the upper attachment area of the fishing line. The fact of having the attachment of the hook offset relative to the attachment of the line favors the retention of the fish that is retained by the lure. When the fish bites the lure, the upper area is the area with the most tension and the fact of having the fixing part of the attachment rod connected to the lower area enables a lower resultant of the forces exerted on the lure by the fish.

According to the invention, the point of the hook may be disposed outside the body and flush with the body. The position of the point of the hook enables snagging algae or other aquatic elements to be avoided. Moreover, manipulation of the lure is without hazard for the user.

According to another feature, the rear end is flattened in a substantially inclined plane passing through a substantially inclined first straight line segment lying in the plane of the attachment rod and inclined relative to the vertical and a second straight line segment in the horizontal transverse direction relative to the longitudinal axis of the lure. With the aid of the movements of the operator when reeling in the line and this end of the body, the lure acts like a real fish because the rear end imparts to the lure an oscillatory movement.

BRIEF DESCRIPTION OF THE SEVERAL VIEWS OF THE DRAWINGS

The present invention will be better understood on reading the following detailed description based on the appended drawings, in which:

FIG. 1 is a side view of the lure of the invention;

FIG. 2 is a view similar to that of FIG. 1, showing the components situated inside the body;

FIG. 3 is an exploded view of the lure of the invention;

FIGS. 4a to 4d are views in section taken along the lines A-A to D-D; and

FIG. 5 is a top view of the lure of the invention.

DETAILED DESCRIPTION OF THE INVENTION

The angling lure 10 of the invention is designed to be used for line fishing. The lure 10 is attached to one end of a line from a fishing rod or other fishing device.

The lure 10 of the invention may be seen in the appended FIGS. 1 to 5. It resembles a real fish of small size to form bait for species of larger size that the angler wishes to catch.

The lure 10 includes a metal, for example lead, or rigid plastic head 12 that is attached to the fishing line by means of a ring 14 disposed on the top of the head 12. The weight of the head 12 enables the lure 10 to be immersed completely in the water. The head 12 has a substantially conical shape on which are drawn members such as eyes, a mouth, nostrils, to obtain a close resemblance to a real small fish. As shown in FIGS. 1 to 5, the head 12 is disposed so that the main axis of the cone is substantially horizontal and the base of the cone forms a rear face 16 adapted to come into contact with a body 18.

The body 18 is made from flexible plastic or other material. It has the shape of a fish's body 18 with a tail and a ventral part. The plastic material is preferably decorated with patterns evoking the scales of a fish. These patterns may for example be flakes with scintillating reflections similar to those of the scales of a fish.

The body 18 extends in a longitudinal direction between a first end 20 at the front and a rear end 22.

The rear end 22 is flattened in a substantially inclined plane passing through a substantially inclined first straight line segment 51 lying in the plane of the attachment rod 32 and inclined relative to the vertical 50 at the angle α between 10 and 30° and a second straight line segment 52 in the transverse direction and horizontal relative to the longitudinal axis of the lure. On reeling in the line and this end of the body, the lure exhibits an oscillatory movement that simulates the movements of a fish. Moreover, a reinforcement between the rear end 22 and the body 18 of the lure 10 enables tearing off at this point to be prevented and reinforces the vibratory movement of the lure.

When the lure 10 is assembled the body 18 and the head 12 are assembled so that the front end 20 of the body 18 is in contact with the rear face 16 of the head 12 and the body 18 that extends the head 12 extends in the horizontal longitudinal direction oriented substantially perpendicularly to the rear face 16 of the head 12.

The rear face 16 of the head 12 preferably includes a rim 24 and the front end 20 of the body 18 preferably includes an edge 26, the rim 24 and the edge 26 having complementary shapes that cooperate with each other to facilitate and to guide the correct positioning of the body 18 on the head 12.

The body 18 includes openings 28 shown in dotted line in FIG. 3 for guiding and correctly positioning the various components, such as a hook 30 or attachment means to be described in more detail in the remainder of the description. These openings 28 enable breaking points on insertion of these components to be avoided, which could afterwards reduce the strength and create areas of weakness from which the body 18 could be torn off when it is subjected to the stresses of an aquatic medium.

The lure 10 of the invention further includes a hook 30 extending between a first end including an eyelet 34 and a second end including a point 36. FIG. 2 shows the lure 10 in the assembled position with the hook 30 disposed inside the body 18. In this position, the point 36 of the hook 30 is flush with the body 18 of the lure 10, i.e. is level with the body 18, to avoid snagging algae or other aquatic elements.

The lure 10 further includes attachment means 32 formed by a rod enabling connection of the head 12, the body 18 and the hook 30 and the lure 10 to be maintained in the assembled position. To this end, the attachment rod 32 has a first end 38 firmly fixed to the rear face 16 of the head 12 and a free end 40 from which the eyelet 34 and the body 18 are threaded over the rod.

The attachment rod 32 is substantially S-shaped, the lower curved portion 42 of which, called the fixing portion, is firmly fixed to the head 12 and receives the eyelet 34 of the hook 30. In this way the hook 30 is prevented from leaving its housing and this also ensures mobility between the head 12 and the body 18.

The upper portion 44 of the attachment rod 32, called the retaining portion, is adapted to exert a force compressing the portion of the body 18 disposed between the rear face 16 of the head 12 and said retaining portion 44.

To this end the retaining portion 44 lies in a plane substantially parallel to the plane defined by the rear face 16 of the head 12. As may seen in FIGS. 2 and 3, the retaining portion also extends in a vertical direction perpendicular to the longitudinal direction.

In order to improve the retention of the body 18 against the head 12, the retaining portion 44 extends substantially parallel to a central area of the rear face 16 of the head 12, and the fixing portion 42 is fastened to the rear face 16 in a lower area thereof. Thanks to these features, the retaining forces are exerted on a central area of the front end 20 of the body 18, which assures better stability of the lure 10 in the assembled position.

The attachment rod 32 further includes a curved portion 46 at its free end 40 enabling easier insertion in the body 18, without the rod digging into the flexible material of the body 18. In this way, the curved portion 46 prevents tearing and does not damage the body 18 with the result that the body 18 may be reused or re-assembled. Moreover, the free end 40 cooperates with the opening 28 of the body to improve retention by preventing rotation of the body 18 relative to the head 12.

The curved shape 46, oriented downward, further makes it possible to prevent removal of the hook 30 when the lure 10 is in use and notably when it is subjected to high stresses, when a fish is pulling on the line.

The lure 10 of the invention is constituted of different components that may be easily assembled together. The lure 10 thus has the advantage that it may be sold as a kit, the user choosing the esthetic shapes of the body 18 and the head 12 as a function of the type of angling they are doing.

Moreover, the hook 30 is mobile relative to the body 18, since it is not fixed directly thereto. Accordingly, if a fish ceases the lure 10, it exerts with its mouth a movement tending to raise the hook 30 and thus to move the point 36 away from the body 18. The hook 30 is thus rendered accessible and the fish is then hooked.

The invention is in no way limited to the embodiments described and shown, which are provided by way of example only.

I claim:

1. An angling lure comprising:
   a rigid head having rear face;
   a flexible body extending longitudinally between a front end and a rear end, said front end contactable with said rear face of said rigid head, said rigid head and said flexible body having a shape corresponding to a shape of bait, said flexible body having an internal cavity that opens to a bottom of said flexible body, said rear end of said flexible body having a face that extends entirely along an angle of between 10° and 30° to vertical;
   a hook having a first end and a second end, said first end having an eyelet, said second end having a point, said point disposed so as to as to be exposed externally of said flexible body and positioned so as to be generally flush with said flexible body;
   an attachment rod having a first end fastened to said rigid head and having a free second end, said eyelet of said hook being threaded onto said attachment rod, said attachment rod having a fixing portion between said first end and said free second end thereof, said fixing portion being curved such that said free second end faces downwardly and opens said fixing portion in a direction away from said rigid head, said attachment rod having an elongated retaining portion lying in a vertical plane passing through a longitudinal axis thereof, said elongated retaining portion having said fixing portion connected to or formed at an upper end thereof, said elongated retaining portion extending parallel to a central area of said rear face of said head, said elongated retaining portion exerting a force compressing a portion of said flexible body disposed between said rear face of said head and said attachment rod so as to retain said flexible body against said rear face of said head, said flexible body having openings receiving said hook and said attachment rod, said attachment rod being S-shaped, wherein said rear face comprising a first rim extending outwardly and rearwardly from said rear face of said rigid head so as to contact with said front end of said flexible body, said rear end of said flexible body being flattened in a substantially inclined plane passing through a substantially inclined first straight line segment lying in a plane of said attachment rod and inclined relative to vertical and a second straight line segment in a horizontal transverse direction relative to a longitudinal axis of said flexible body, said attachment rod allowing said flexible body to oscillate relative to said rigid head; and
   a reinforcement positioned between said rear end and said flexible body.

2. The angling lure of claim 1, wherein said rear face comprises a first rim adapted to come into contact with a second edge of said flexible body.

3. The angling lure of claim 1, wherein said fixing portion is adapted to receive said eyelet of said hook.

4. The angling lure of claim 1, wherein the free end of said attachment rod is curved to prevent said free end from digging into said body.

5. The angling lure of claim 1, wherein said rear face of said head has a lower area to which said fixing portion is fixed, a central area which said retaining portion faces, and an upper area.

* * * * *